(12) United States Patent
Horikawa

(10) Patent No.: US 12,444,059 B2
(45) Date of Patent: Oct. 14, 2025

(54) INFORMATION PROCESSING APPARATUS, LEARNING APPARATUS, AND TRACKING METHOD

(71) Applicant: CANON KABUSHIKI KAISHA, Tokyo (JP)

(72) Inventor: Yuta Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 315 days.

(21) Appl. No.: 18/335,174

(22) Filed: Jun. 15, 2023

(65) Prior Publication Data
US 2024/0005528 A1 Jan. 4, 2024

(30) Foreign Application Priority Data

Jul. 1, 2022 (JP) .................................. 2022-107358

(51) Int. Cl.
*G06T 7/246* (2017.01)
*G06T 7/73* (2017.01)

(52) U.S. Cl.
CPC ............... *G06T 7/248* (2017.01); *G06T 7/74* (2017.01); *G06T 2207/20084* (2013.01)

(58) Field of Classification Search
CPC .. G06T 7/248; G06T 7/74; G06T 2207/20084
See application file for complete search history.

(56) References Cited

U.S. PATENT DOCUMENTS 10,504,027 B1 * 12/2019 Kim .................... G06N 3/09
2020/0342209 A1 * 10/2020 Li ..................... G06T 19/006

FOREIGN PATENT DOCUMENTS

| CN | 110443829 A | * | 11/2019 | ............. G06T 7/246 |
| JP | 2008-250772 A | | 10/2008 | |
| JP | 2013186478 A | * | 9/2013 | |

OTHER PUBLICATIONS

Li, B. et al., "High Performance Visual Tracking with Siames Region Proposal Network" 2018 IEEE/CVF Conference on Computer Vision and Pattern Recognition (Jun. 2018) pp. 8971-8980.
Zhou, X. et al., "Objects as Points" arXiv:1904.07850v2 (Apr. 2019) pp. 1-12.
Jain, A.K. et al., "Unsupervised Texture Segmentation Using Gabor Filters" IEEE Pattern Recognition (Jan. 1991) pp. 14-19.

* cited by examiner

*Primary Examiner* — Pinalben Patel
(74) *Attorney, Agent, or Firm* — Carter, DeLuca & Farrell LLP

(57) ABSTRACT

An information processing apparatus obtains a reference image including a target object image to be tracked, determines a plurality of positions in the reference image, and generates a plurality of first features corresponding to the plurality of positions by inputting the reference image to a feature extraction neural network. The apparatus further obtains a search image that is a target of the tracking processing of the target object image, and generates a second feature by inputting the search image to the feature extraction neural network. Then, the apparatus identifies a position of the target object image included in the search image based on a result of a correlation operation between each of the plurality of first features and the second feature.

14 Claims, 14 Drawing Sheets

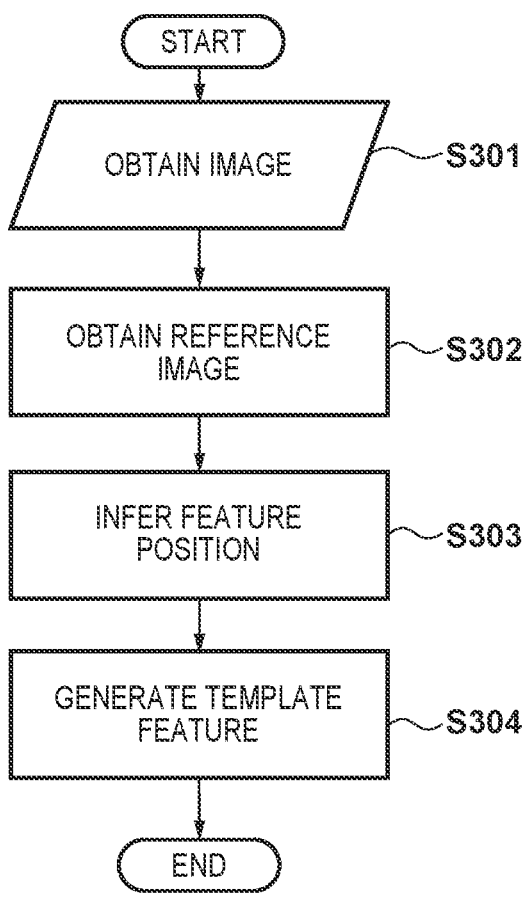
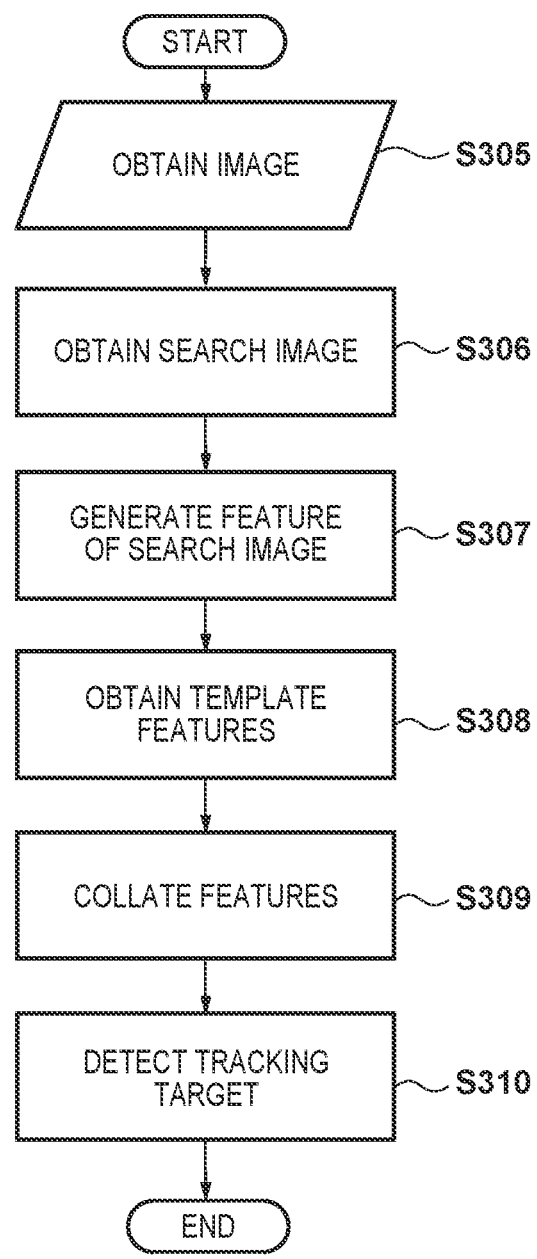

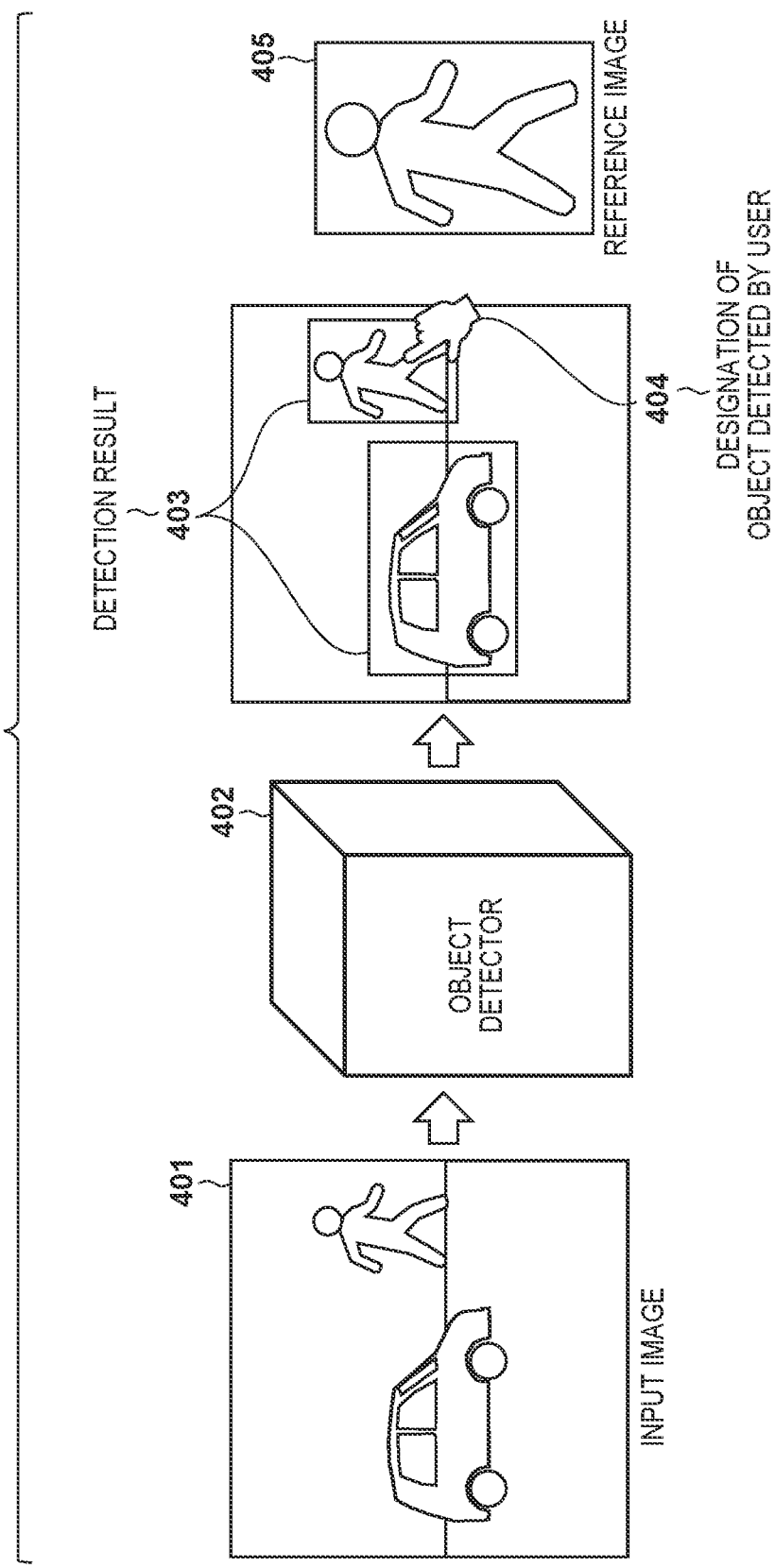

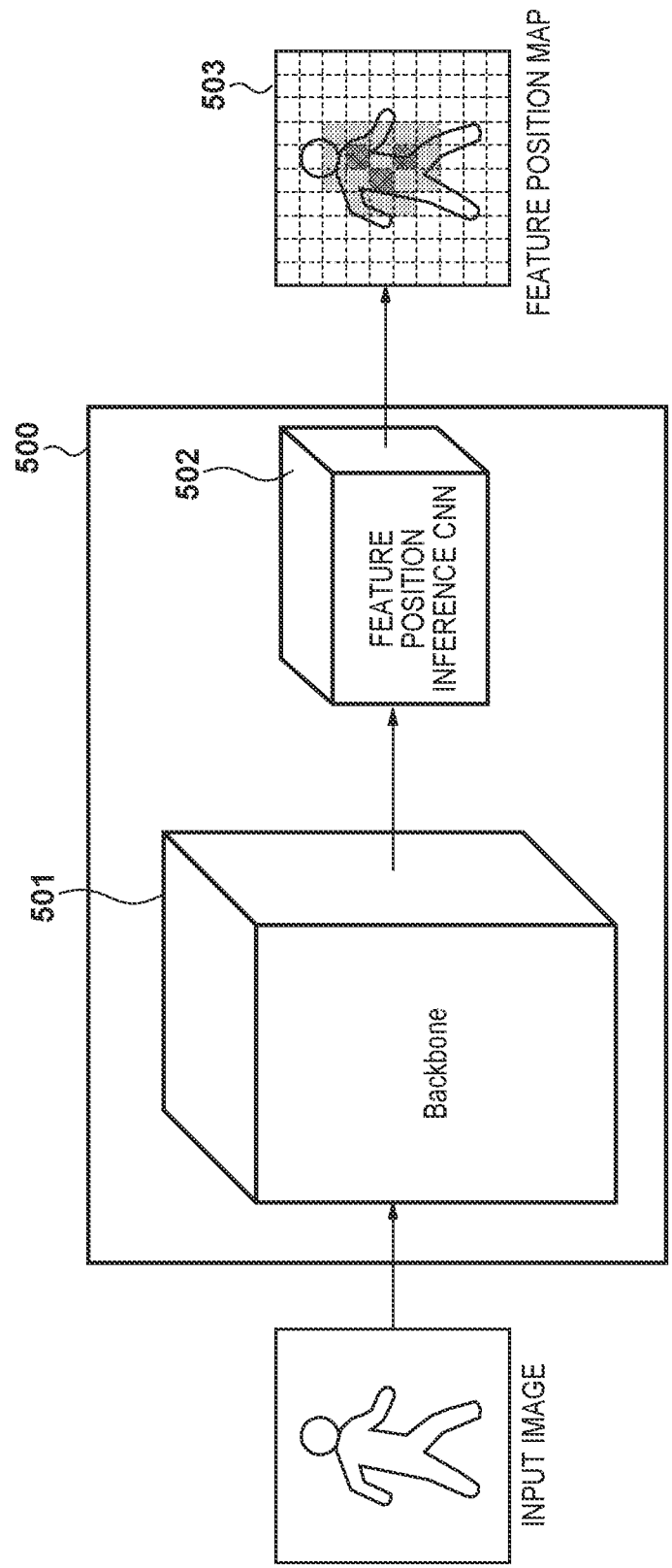

INFORMATION PROCESSING APPARATUS, LEARNING APPARATUS, AND TRACKING METHOD

BACKGROUND OF THE INVENTION

Field of the Invention

The present invention relates to a technique of tracking an object in a moving image.

Description of the Related Art

In general, when tracking an object in a moving image, image information representing the feature of the object is created in advance before tracking, and tracking is performed by matching with the image information. As such techniques, a technique using brightness or color information, a technique using template matching, and a technique using a Convolutional Neural Network (CNN) exist. For example, when using template matching, a template image representing an object serves as image information for tracking. When using a CNN, a CNN feature in an object region serves as image information for tracking.

Tracking cannot be performed well unless the image information of the object necessary for the tracking appropriately includes information that can easily be tracked. For example, in Japanese Patent Laid-Open No. 2008-250772 (patent literature 1), a plurality of templates are obtained in correspondence with one tracking target. For this reason, even if one template fails in tracking, tracking can be performed using the remaining templates. At this time, the templates are obtained based on the shape, texture, and color of the object.

However, a plurality of template features in patent literature 1 are designed manually, and whether the features are effective in tracking is not examined. In addition, since a suitable combination of template features changes for each object, the combination pattern of template features needs to be considered in accordance with an object. Hence, to apply templates to an arbitrary object, an enormous number of template patterns need to be prepared.

SUMMARY OF THE INVENTION

According to one aspect of the present invention, an information processing apparatus comprises: a first obtaining unit configured to obtain a reference image including a target object image to be tracked; a determination unit configured to determine a plurality of positions in the reference image to be used for tracking processing of the target object image; a first generation unit configured to generate a plurality of first features corresponding to the plurality of positions by inputting the reference image to a feature extraction neural network; a second obtaining unit configured to obtain a search image that is a target of the tracking processing of the target object image; a second generation unit configured to generate a second feature by inputting the search image to the feature extraction neural network; and an identification unit configured to identify a position of the target object image included in the search image based on a result of a correlation operation between each of the plurality of first features and the second feature.

The present invention enables to appropriately perform tracking of an object in a moving image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are flowcharts showing processing of the information processing apparatus according to the first embodiment;

FIG. 4 is a view for explaining obtaining of a reference image using an object detector;

FIG. 5 is a view for explaining the configuration of a feature position inference unit;

DESCRIPTION OF THE EMBODIMENTS

Figure 1:
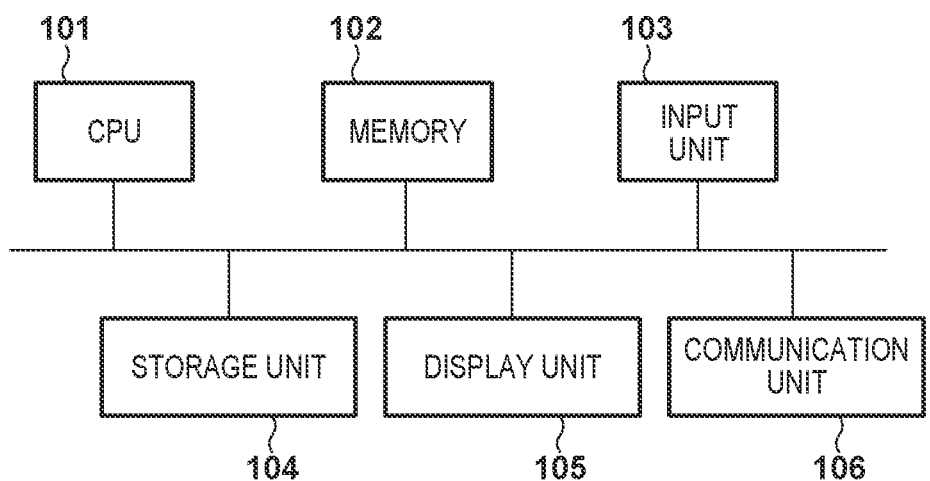
FIG. 1 is a view showing the hardware configuration of an information processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

As the first embodiment of an information processing apparatus according to the present invention, an information processing apparatus 100 that performs tracking processing of an object included in a video obtained by an image capturing apparatus 200 will be described below as an example. Note that in the following explanation, the image capturing apparatus 200 and the information processing apparatus 100 are assumed to be integrated to form a digital camera. However, these may be formed as separate apparatuses.

<Configuration of Information Processing Apparatus>

FIG. 1 is a view showing the hardware configuration of the information processing apparatus 100. The information processing apparatus 100 can be formed using a general-purpose information processing apparatus, and includes a CPU 101, a memory 102, an input unit 103, a storage unit 104, a display unit 105, a communication unit 106, and the like.

Figure 2:
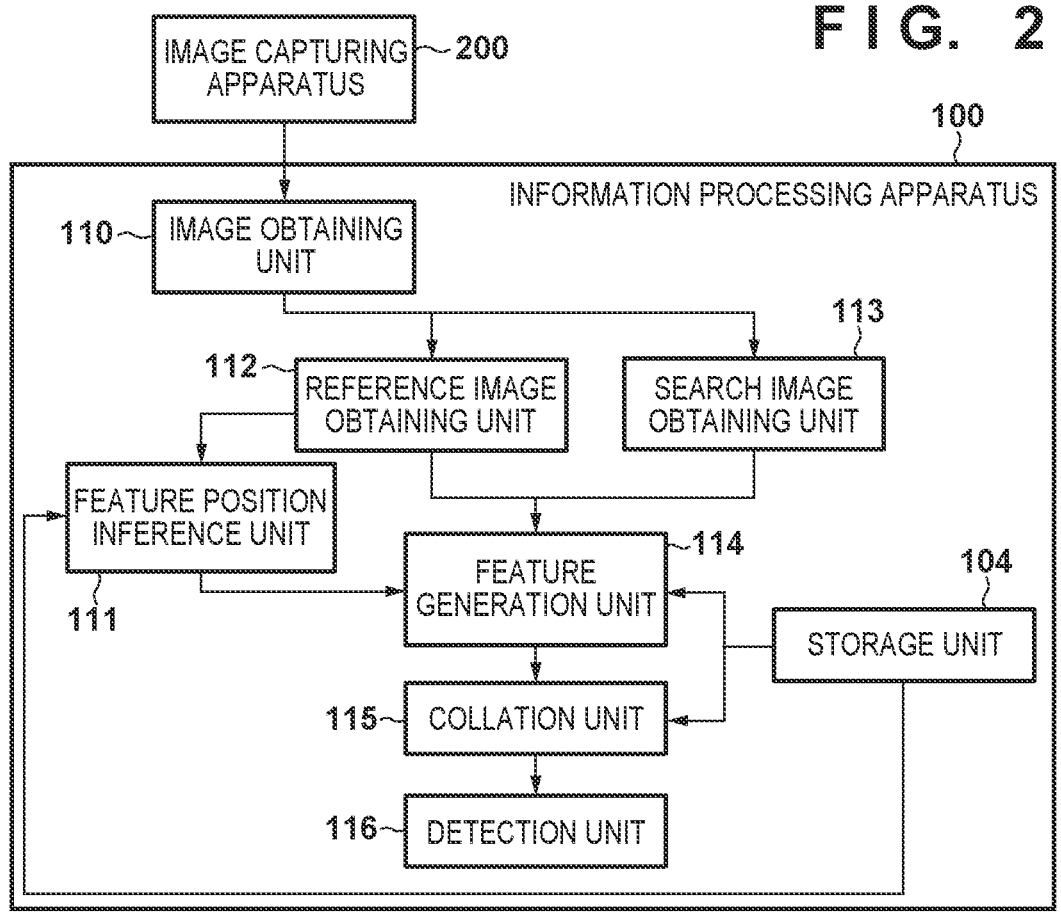
FIG. 2 is a view showing the functional configuration of the information processing apparatus according to the first embodiment.

FIG. 2 is a view showing the functional configuration of the information processing apparatus according to the first embodiment. The image capturing apparatus 200 can be formed using an optical system, an image capturing element, and the like. The image capturing apparatus 200 captures an image and outputs it to an image obtaining unit 110 of the information processing apparatus 100. The information processing apparatus 100 includes the image obtaining unit 110, a feature position inference unit 111, a reference image obtaining unit 112, a search image obtaining unit 113, a feature generation unit 114, a collation unit 115, a detection unit 116, and the storage unit 104.

The storage unit 104 stores inference parameters learned by a learning apparatus 1001 to be described later. More specifically, an inference parameter of a model that infers the position of a template feature and an inference parameter of a model that tracks an object are included.

The image obtaining unit 110 obtains time-series images (frame images that form a video) sequentially captured by the image capturing apparatus 200. The feature position inference unit 111 infers a position suitable for a template feature to be used for object tracking from an object in an image. The reference image obtaining unit 112 generates a reference image that cuts out an object of a tracking target (tracking target object) from an image. The search image obtaining unit 113 generates a search image that cuts out a region to search for the tracking target object from the entire image.

When an image is input, the feature generation unit 114 generates the feature of the image. The collation unit 115 collates the feature of the reference image and that of the search image, which are obtained from the feature generation unit 114, thereby generating a map representing the position and the size of the tracking target object in the search image. The detection unit 116 detects the tracking target object in the search image based on the map that is obtained from the collation unit 115 and represents the position and the size of the tracking target object.

<Operation of Information Processing Apparatus>

FIGS. 3A and 3B are flowcharts showing processing of the information processing apparatus according to the first embodiment. More specifically, processing of designating a tracking target object and tracking the tracking target object from a video (a plurality of time-sequential frame images) will be described.

FIG. 3A shows processing of designating a tracking target object. More specifically, FIG. 3A shows processing of setting a tracking target object by a user designating (for example, performing a touch operation on) an object in a video (frame images) displayed on the display unit of the digital camera. FIG. 3B shows processing of tracking the tracking target object in subsequent frame images. Note that the tracking processing according to this embodiment will be described based on a method using a Neural Network (NN) in non-patent literature 1 (non-patent literature 1: Bo Li et al., "High Performance Visual Tracking with Siames Region Proposal Network", 2018).

In step S301, the image obtaining unit 110 obtains an image captured by the image capturing apparatus 200. It is assumed that a tracking target object is included in the image.

In step S302, the reference image obtaining unit 112 obtained, from the image obtained by the image obtaining unit 110, a reference image that cuts out the region of the tracking target object. Also, the reference image obtaining unit 112 obtains the position of the tracking target object in the image by a user operation (for example, a touch operation).

FIG. 4 is a view for explaining obtaining of a reference image using an object detector. First, the reference image obtaining unit 112 inputs the image obtained from the image obtaining unit 110 to an object detector 402 as an input image 401. The object detector 402 outputs, as detection results 403, the center positions and sizes of various objects in the input image. In FIG. 4, two object frames corresponding to two objects (a vehicle and a person) are output. Such an object detector is implemented using an object detection method described in, for example, non-patent literature 2 (non-patent literature 2: Xingyi Zhou et al., "Objects as Points", 2019).

Next, of the detection results 403 (object frames) output by the object detector, an object frame closest to the position designated by an operation 404 (designation of the tracking target object by the user) is obtained. A partial image corresponding to the object frame obtained here is cut out and obtained as a reference image 405 (reference image generation). Note that a method of cutting out a region of a fixed size for the designed position may be used.

In step S303, the feature position inference unit 111 infers and determines the position (to be referred to as a feature position hereinafter) of a template feature suitable for tracking the object included in the reference image obtained from the reference image obtaining unit 112. The feature position inference unit 111 generates, as an inference result, a feature position map representing the weight distribution of the positions of template features suitable for tracking in the reference image and outputs the feature positions.

The feature position inference unit 111 includes an inference device serving as a second processing unit configured to, when an image is input, infer the position of a template feature suitable for tracking an object included in the image. Such an inference device can be implemented by, for example, a method using a known machine learning method such as an NN or a Support Vector Machine (SVM). The weight of an NN learned in advance is stored as an inference parameter in the storage unit 104. At the time of inference, the inference unit 111 reads out the inference parameter from the storage unit 104 and performs inference. Here, the feature position inference unit 111 implemented using an NN will be described.

FIG. 5 is a view for explaining the configuration of the feature position inference unit 111. As an example, the feature position inference unit 111 includes a multilayer CNN 500. The multilayer CNN 500 has a network structure used in object detection of non-patent literature 2 or the like. In such a network, when an image is input to a Backbone network, a convolution operation and pooling are repetitively performed for the image, and as a result, a feature representing a certain feature of the image is output. A feature obtained via a Backbone 501 is input to a feature position inference CNN 502. As a result, the feature position inference CNN 502 outputs a feature position map 503 representing the positions of template features to be easily tracked concerning an object in the image. The learning method of the feature position inference unit 111 will be described later.

In the feature position map 503, the resolution (size) of the image decreases in the process of repetitively performing convolution and pooling of the image. The feature position map includes, at a position on the map corresponding to a position on the input image, a likelihood value representing the likelihood of the position having a feature to be easily tracked.

In this embodiment, three template features (positions) are inferred for one object. Tracking performance can be improved by using the three template features obtained based on the inference result. One feature position map is output, and a reaction to exhibit a peak is obtained at the feature positions of three points on the map. As for the positional relationship between the three inferred feature positions, the feature positions are inferred as positions close to each other.

The feature position inference unit 111 calculates the peak position of each likelihood in the obtained feature position map. At this time, the positions of three points are obtained in descending order of likelihood score. These are output as feature position coordinates to the feature generation unit 114.

In step S304, the feature generation unit 114 generates a template feature based on the reference image obtained from the reference image obtaining unit 112 and the feature positions obtained from the feature position inference unit 111. The generated template feature is stored in the storage unit 104 and used in tracking processing to be described with reference to FIG. 3B. Generation of a template feature will be described in more detail.

Figure 6:
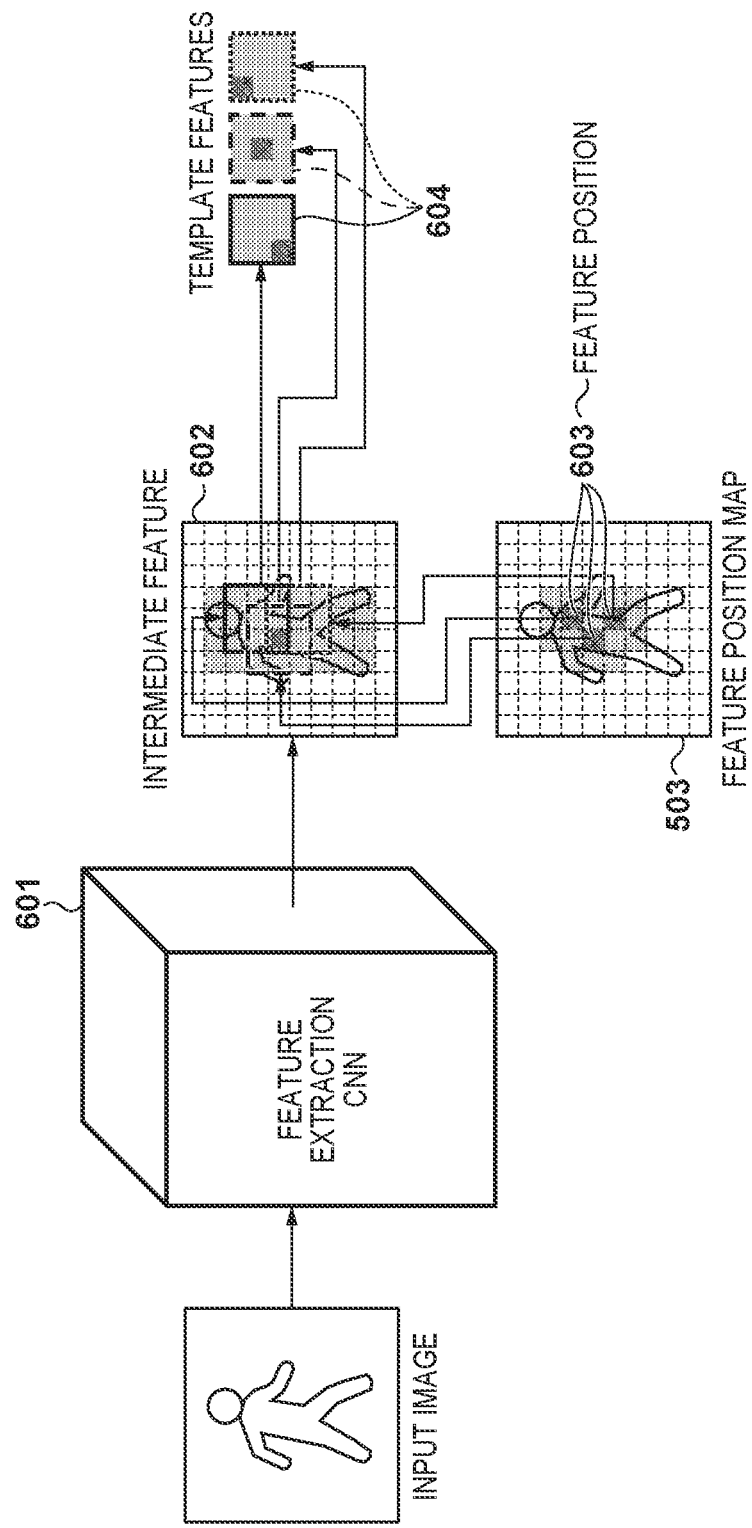
FIG. 6 is a view for explaining generation of a template feature.

FIG. 6 is a view for explaining generation of a template feature. In a case where a tracking method using an NN in non-patent literature 1 is used, when an input image is input to a feature extraction CNN 601 serving as a first processing unit, an intermediate feature 602 that is a feature image is obtained as a network output result. Also, the region (small region) of a part in the intermediate feature that is a feature image is extracted based on the feature positions calculated from the feature position map 503, and this is obtained as a template feature. The peak positions of likelihoods calculated from the feature position map 503 obtained in step S303 are defined as feature position coordinates 603.

Next, a region obtained by cutting out the periphery of the feature position coordinates 603 on the intermediate feature 602 is extracted as a template feature. For example, in FIG. 6, a feature in a small rectangular region having a height of 3 and a width of 3 with respect to the feature position as the center is extracted as a template feature 604. The extracted three template features 604 are stored in the storage unit 104 for use in subsequent tracking processing.

When the processing shown in FIG. 3A is ended, the processing of tracking the tracking target object shown in FIG. 3B is started.

In step S305, the image obtaining unit 110 obtains an image from the image capturing apparatus 200. The image includes the tracking target object.

In step S306, the search image obtaining unit 113 obtains a search image that cuts out a region to search for the tracking target object from the obtained image. The search image is cut out based on the region of the reference image and a preceding tracking result.

Figure 7:
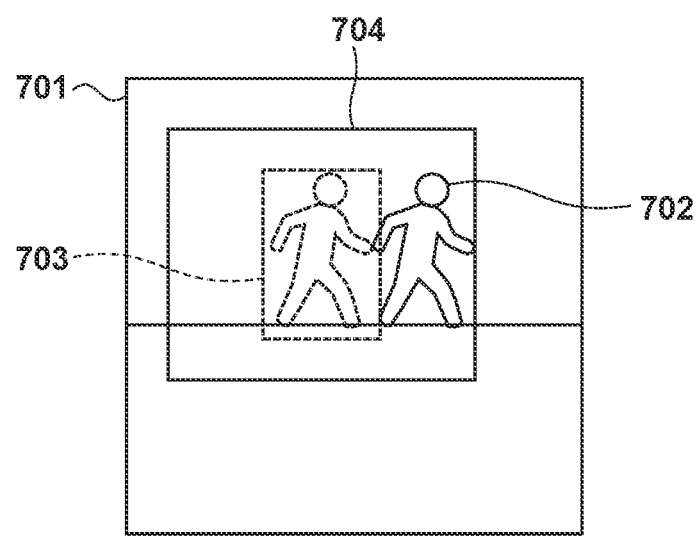
FIG. 7 is a view for explaining a search image.

FIG. 7 is a view for explaining the search image. The search image (a region 704 of the search image at the current time) is a partial image of the image (an image 701 at the current time) obtained in step S306, and is determined based on a detection result or tracking result 703 of the tracking target object at the preceding time. The preceding time is, for example, the time of the preceding frame image. For example, the region 704 of the search image is determined as a region obtained by enlarging the size of the object at a predetermined ratio with respect to the center position of the tracking target object of the detection result or tracking result 703 at the preceding time. Note that if the processing at the preceding time is the processing of designating the tracking target object by the user (FIG. 3A), the region of the search image is determined from the detection result obtained by the object detector 402. On the other hand, if the processing at the preceding time is tracking processing, the region of the search image is determined from the tracking result.

In step S307, based on the search image obtained from the search image obtaining unit 113, the feature generation unit 114 generates a feature of the search image. When the search image is input, the feature generation unit 114 generates the feature of the image. An intermediate feature obtained by inputting the search image to the NN of the feature generation unit 114 is obtained as the feature of the search image.

In step S308, the collation unit 115 obtains the template features stored in the storage unit 104. In step S304, a plurality of template features are stored in correspondence with one tracking target object, and all template features are obtained here.

In step S309, the collation unit 115 obtains the maps of the position and the size of the tracking target object in the search image using the plurality of template features and the feature of the search image.

Figure 8:
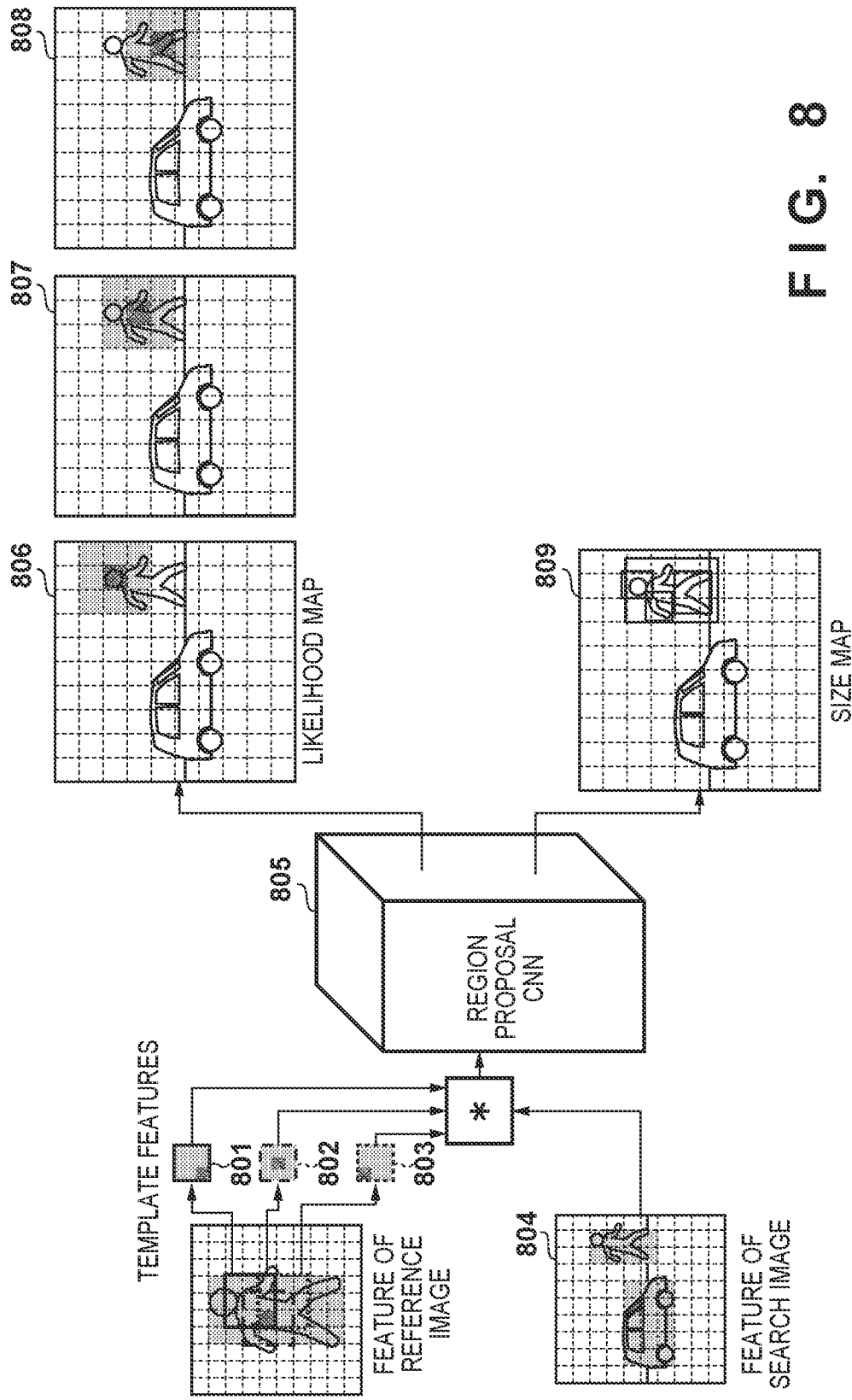
FIG. 8 is a view for explaining obtaining of likelihood maps and a size map.

FIG. 8 is a view for explaining obtaining of likelihood maps of positions and a size map. The collation unit 115 performs a convolution operation of three template features 801, 802, and 803 obtained in step S308 to a feature 804 of the search image, thereby obtaining three intermediate features. The three intermediate features are input to a region proposal CNN 805, and likelihood maps 806, 807, and 808 representing the position of the tracking target object in the search image are output. In addition, a size map 809 representing three sizes corresponding to the three likelihood maps is output. FIG. 8 shows an example in which three likelihood maps and one size map are output in correspondence with three template features. The region proposal CNN 805 can be implemented using, for example, a CNN of non-patent literature 1.

In step S310, the detection unit 116 identifies the position and the size of the tracking target object from the likelihood maps and the size map obtained in step S309 and outputs these as a tracking result. Here, three likelihood maps and one size map are used.

Figure 9:
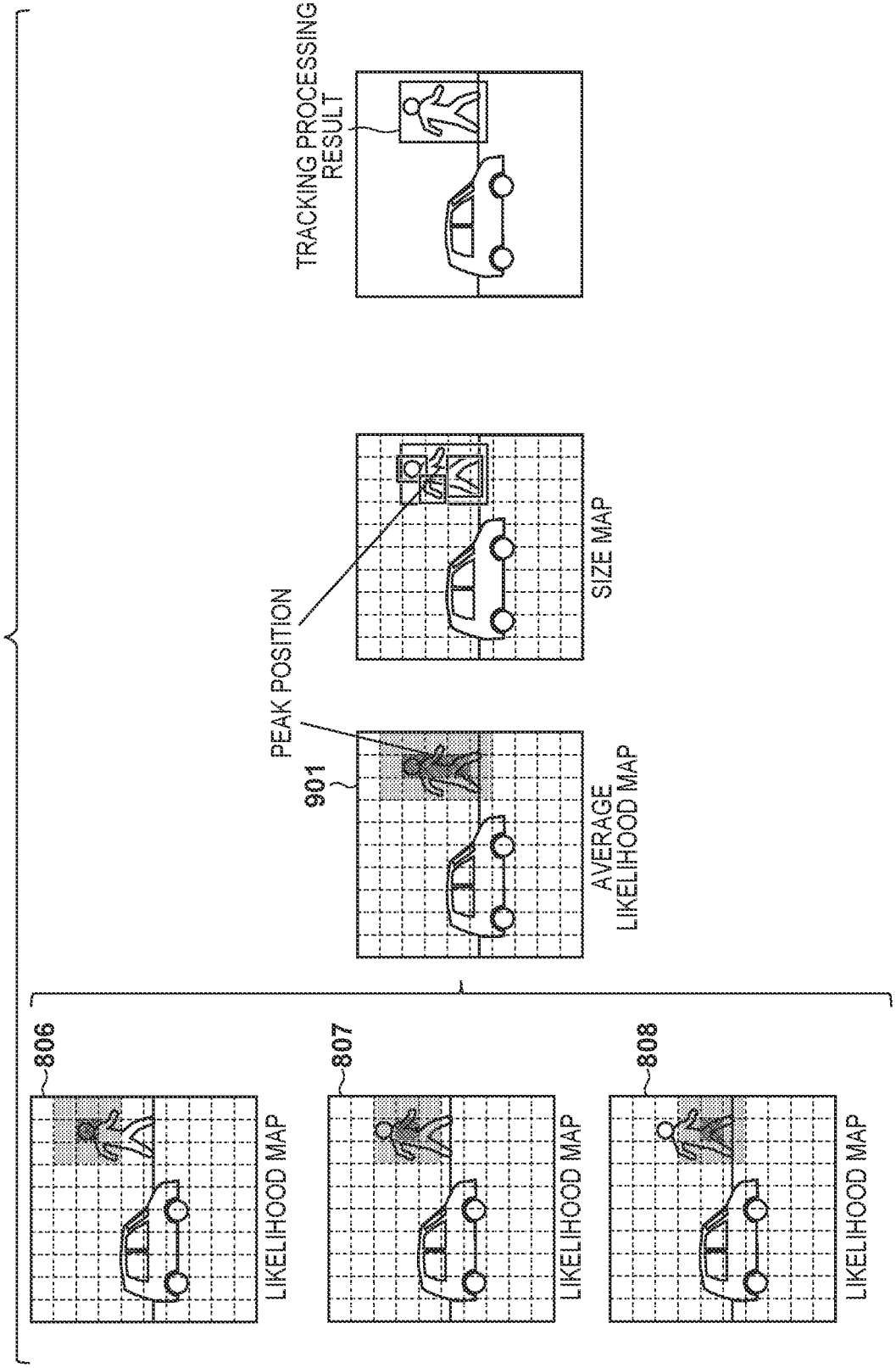
FIG. 9 is a view for explaining tracking using the likelihood maps and the size map.

FIG. 9 is a view for explaining tracking (identification of the position of the tracking target object) using the likelihood maps and the size map. First, the detection unit 116 calculates an average likelihood map 901 by averaging the likelihood maps 806, 807, and 808 obtained in step S309. Next, the peak position of the likelihood value in the average likelihood map 901 is calculated, and the position is defined as the position of the tracking target object. After that, a value in the size map at the same position as the position of the tracking target object is obtained, and this is obtained as the size of the tracking target object.

By the series of processes described above, the detection unit 116 can output the position and the size of the tracking target object as the result of tracking processing. In particular, when a plurality of likelihood maps are output using a plurality of template features, and the position of the tracking target object is obtained based on an average likelihood map obtained by averaging these, tracking failures can be reduced.

<Configuration of Learning Apparatus>

A method of obtaining the inference parameters of the CNN that forms the above-described feature position inference unit 111 (FIG. 2) will be described below. A learning apparatus is an apparatus for learning the CNN that infers the feature position of a tracking template. Note that the hardware configuration is the same as that of the information processing apparatus 100 (FIG. 1), and a description thereof will be omitted.

Figure 10:
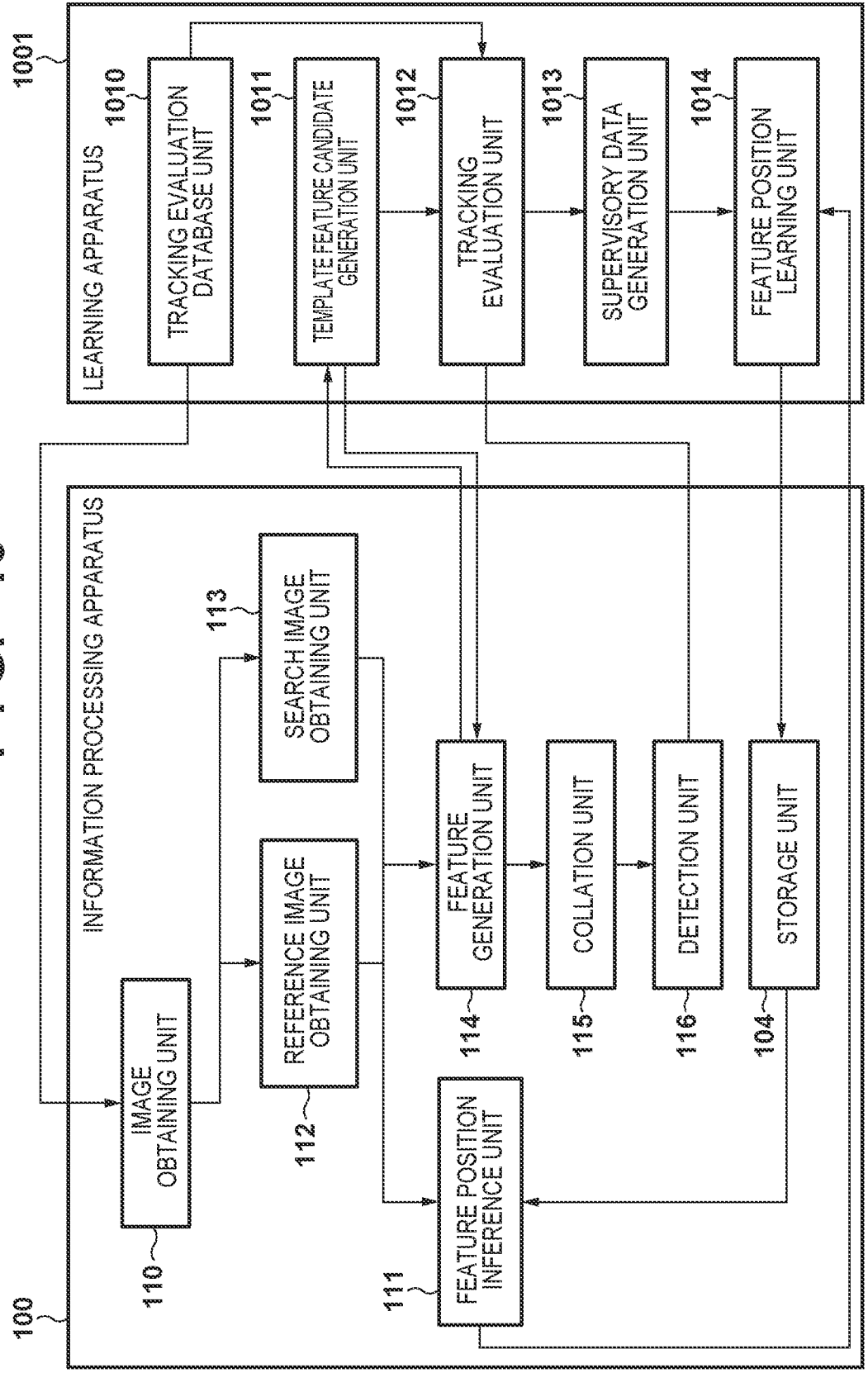
FIG. 10 is a view showing the functional configuration of a learning apparatus according to the first embodiment.

FIG. 10 is a view showing the functional configuration of the learning apparatus according to the first embodiment. The learning apparatus 1001 includes a tracking evaluation database unit 1010, a template feature candidate generation unit 1011, a tracking evaluation unit 1012, a supervisory data generation unit 1013, and a feature position learning unit 1014.

The learning apparatus 1001 operates in cooperation with the information processing apparatus 100, thereby learning an inference parameter used by the feature position inference unit 111 to infer a feature position. The inference parameter obtained by learning is stored in the storage unit 104.

The tracking evaluation database unit 1010 stores a set of time-series images including an object. The tracking evaluation database unit 1010 is a database holding an image and supplementary information (metadata) such as the position, size, and ID of an object in the image together. The ID is set such that identical objects in the time-series images can be identified.

The template feature candidate generation unit 1011 determines candidates of positions to extract a template feature from the features that the feature generation unit 114 generates from the reference image. The information processing apparatus 100 generates a template feature based on the position candidates of template features. In addition, the information processing apparatus 100 performs tracking processing for the set of time-series images using the template feature and outputs the detection result to the tracking evaluation unit 1012.

The tracking evaluation unit 1012 calculates the evaluation value of tracking processing from the detection result. The supervisory data generation unit 1013 determines the position of the template feature serving as a supervisor from the template position candidates based on the tracking evaluation result. The feature position learning unit 1014 updates the inference parameter of the feature position inference unit 111 based on the inference result of the feature position inference unit 111 and the position of the template feature obtained from the supervisory data generation unit 1013. The updated inference parameter is stored as an inference model in the storage unit 104.

<Learning Method>

Figure 11:
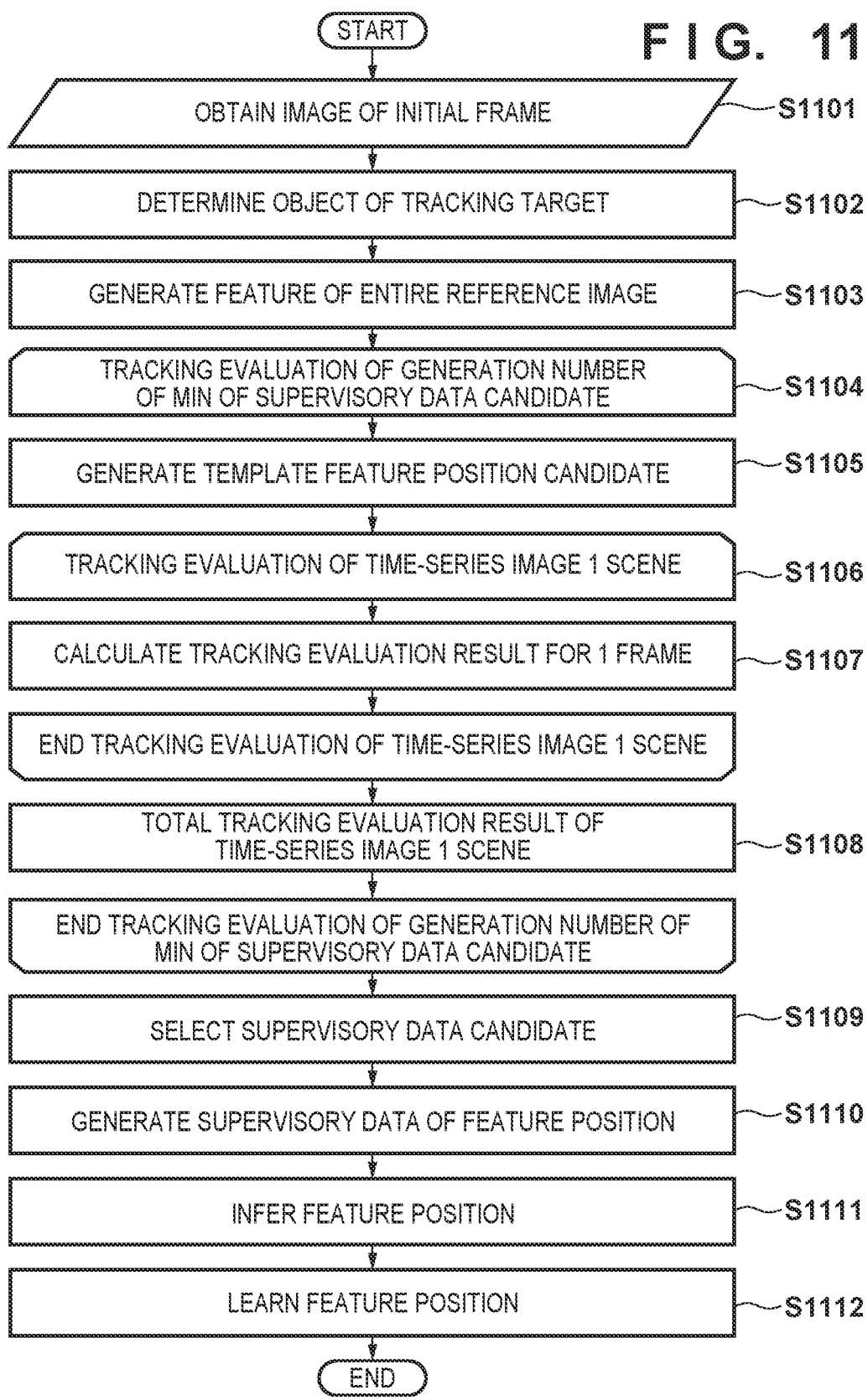
FIG. 11 is a flowchart showing processing of the learning apparatus according to the first embodiment.

FIG. 11 is a flowchart showing processing of the learning apparatus according to the first embodiment. More specifically, a method of learning an inference parameter to be used by the feature position inference unit 111 will be described.

In step S1101, the image obtaining unit 110 obtains the first frame image of time-series images. In step S1102, the reference image obtaining unit 112 sets one of objects included in the first frame image to a tracking target object. Here, based on the information of the position and the size of the object added together with the frame image, the region image of the tracking target object is cut out from the frame image and output as a reference image to the feature generation unit 114.

In step S1103, the feature generation unit 114 generates the intermediate feature of the reference image obtained from the reference image obtaining unit 112. In the same way as the above-described tracking processing, the feature generation unit 114 inputs the reference image to the NN and obtains the intermediate feature. The obtained intermediate feature is output to the template feature candidate generation unit 1011.

Step S1104 is the entrance to loop processing from step S1105 to step S1108. When the information processing apparatus 100 and the learning apparatus 1001 repeat this loop processing a predetermined number of times, tracking evaluation results for the tracking target object (concerning the set of feature positions and the time-series images) are obtained as many as the predetermined number of times.

In step S1105, the template feature candidate generation unit 1011 determines candidates of feature positions (to be extracted as a template feature from the intermediate feature of the reference image by the feature generation unit 114). The feature generation unit 114 then obtains a template feature from the feature position candidates.

Here, as the feature position candidates, feature positions of a total of three points including the center position of the feature of the entire reference image and two positions selected at random from eight neighbor positions on the periphery are obtained as one set. After that, the feature generation unit 114 extracts, as a template feature, a region having a height of 3 and a width of 3 with respect to each feature position candidate as the center.

Step S1106 is the entrance to loop processing of step S1107. More specifically, the information processing apparatus 100 and the learning apparatus 1001 sequentially obtain second and subsequent frame images in the time-series image set and obtain the evaluation result of tracking processing for all frame images included in the time-series image set.

As the evaluation method of tracking processing, first, the region information of an identification result obtained by inputting an image to the information processing apparatus 100 is obtained. Next, an Intersection over Union (IOU) is calculated using the region information of the tracking target object obtained from the tracking evaluation database unit 1010. If the IOU is equal to or larger than a predetermined value, it is evaluated that tracking succeeds. For one tracking target object in one time-series image set, the above-described evaluation is performed for all frame images, and the ratio of frame images evaluated as success is calculated as the final tracking evaluation result.

In step S1107, the information processing apparatus 100 detects the tracking target object by the series of processes of steps S305 to S310 in FIG. 3B. After that, the tracking evaluation unit 1012 evaluates the detection result of the tracking target object. As described above, the success/failure of tracking is judged based on the IOU between the region of the tracking detection result and the region of the tracking target object obtained from the tracking evaluation database unit 1010 and used as evaluation.

In step S1108, the tracking evaluation unit 1012 totalizes the evaluation results obtained in steps S1106 and S1107, thereby calculating the tracking evaluation result of the time-series image set. Here, the evaluation results in step S1107 are totalized, thereby calculating the ratio of frame images evaluated as success in all frame images.

In step S1109, the supervisory data generation unit 1013 determines one set of feature position candidates serving as a supervisor. Here, based on the result of step S1108, the supervisory data generation unit 1013 determines, as a supervisor, one set of feature position candidates for which the ratio of frame images evaluated as success is highest in the sets of feature position candidates as many as the predetermined number of times.

In step S1110, the supervisory data generation unit 1013 generates a feature position map of supervisory data using the feature positions determined as a supervisor in step S1109. The feature position map of supervisory data is given values by a Gaussian distribution that has peaks at the feature positions of three points serving as a supervisor.

In step S1111, the feature position inference unit 111 generates a feature position map having the reference image obtained in step S1101 as an input.

In step S1112, the feature position learning unit 1014 updates the inference parameter of the feature position inference unit 111 using the feature position map generated in step S1111 and the feature position map generated in step S1110. The updated inference parameter is stored in the storage unit 104.

Updating of the inference parameter is implemented by, for example, the following method. First, a cross entropy error is calculated using the feature position map obtained from the feature position inference unit 111 and the feature position map obtained as a supervisor from the supervisory data generation unit 1013. Next, based on the calculated error value, the inference parameter of the feature position inference unit 111 is updated using error backpropagation.

When the series of processes of step S1101 to S1112 is repetitively performed using a number of time-series image data set, the inference parameter of the feature position inference unit 111 can be learned and obtained.

As described above, according to the first embodiment, the position of a template feature to be easily tracked is inferred, thereby obtaining a template feature. This makes it possible to obtain a template feature suitable for tracking of an arbitrary object. In addition, the tracking accuracy can be raised by combining a plurality of template features.

That is, conventionally, the combination pattern of template feature positions needs to be designed manually. In this embodiment, however, template features can be obtained by learning based on tracking evaluation. Also, concerning a plurality of template features to be obtained, the template features are inferred at positions close to each other. Each likelihood map obtained by a correlation operation between each of the plurality of template features and the feature of a search image is inferred such that the likelihood distributions overlap near the tracking target object. For this reason, even in a case where the likelihood lowers near the tracking target object in a given likelihood map, if the likelihood is high in another likelihood map, the position of the tracking target object can be detected using an average likelihood map obtained by averaging.

Note that in the above description, the tracking method using a CNN has been described. The method can also be applied to template matching in which a part of a reference image is cut out, and brightness information in the region is used as a template feature. In this case, the feature position inference unit 111 infers the center position of the region of the part cut out from the reference image. Then, a region around the inferred center position is cut out and obtained as a template feature.

Second Embodiment

In the second embodiment, a form in which a feature position inference unit infers a feature position from an intermediate feature will be described. More specifically, in the first embodiment, a feature position is obtained by inputting a reference image to the feature position inference unit 111. In the second embodiment, an intermediate feature obtained by inputting a reference image to a feature generation unit 114 is input to a feature position inference unit 111, thereby outputting a feature position map.

<Configuration of Information Processing Apparatus>

Figure 12:
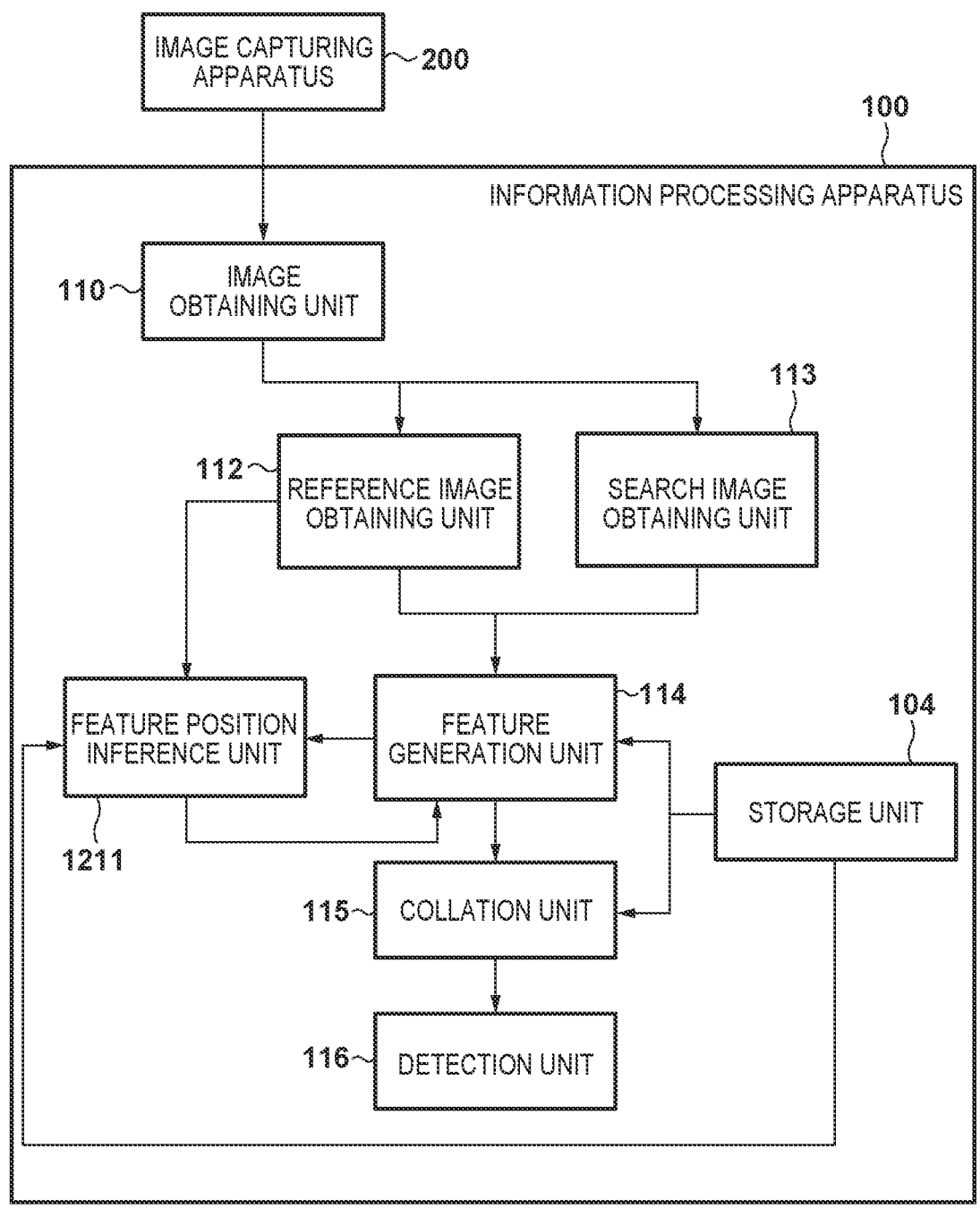
FIG. 12 is a view showing the functional configuration of an information processing apparatus according to the second embodiment.

FIG. 12 is a view showing the functional configuration of an information processing apparatus according to the second embodiment. When an intermediate feature obtained by inputting a reference image to the feature generation unit 114 is input, a feature position inference unit 1211 outputs a feature position map representing the position of a template feature. Based on the output feature position map, a template feature is extracted from the intermediate feature and stored in a storage unit 104. From then on, tracking processing is performed using the template features stored in the storage unit 104, as in the first embodiment.

Figure 13:
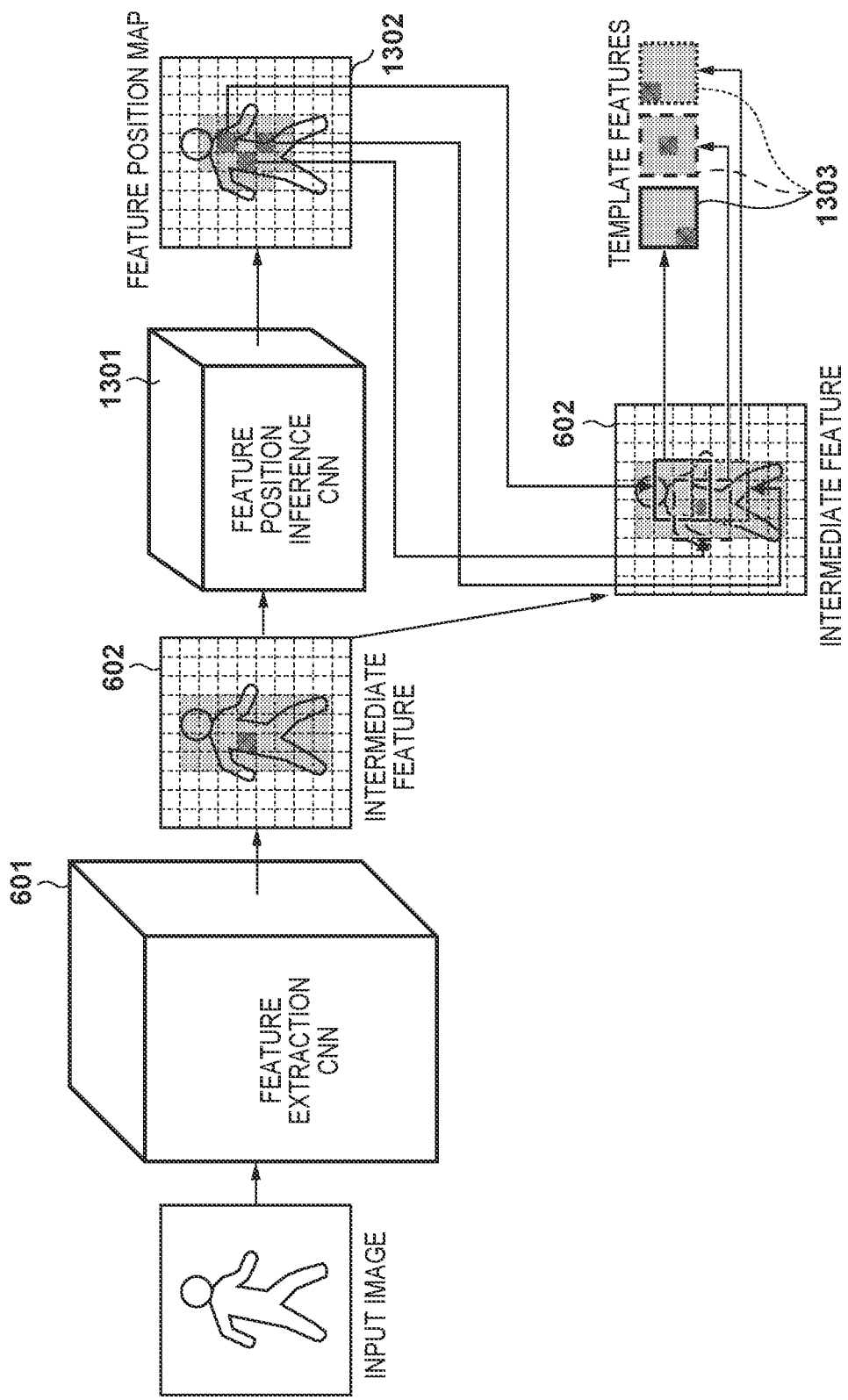
FIG. 13 is a view for explaining generation of a template feature according to the second embodiment.

FIG. 13 is a view for explaining generation of a template feature according to the second embodiment. First, a reference image obtained by a reference image obtaining unit 112 is input as an input image to a feature extraction CNN 601 of the feature generation unit 114, thereby obtaining an intermediate feature 602. Next, the obtained intermediate feature 602 is input to a feature position inference CNN 1301 that forms the feature position inference unit 1211. The feature position inference CNN 1301 outputs a feature position map 1302 having, as a value, a high likelihood at a position suitable for a template feature on the intermediate feature. The feature position inference CNN 1301 is implemented using a CNN having the same configuration as a feature position inference CNN 502 shown in FIG. 5.

A plurality of (three in FIG. 13) peaks of likelihood in the feature position map 1302 are obtained, and these are set to the center positions of template features. In addition, a region (having a height of 3 and a width of 3 in FIG. 13) around the center position of each template feature is extracted on the intermediate feature 602, thereby obtaining a template feature 1303. Subsequently, tracking processing is performed using the plurality of obtained template features, as in the first embodiment.

<Configuration of Learning Apparatus>

Figure 14:
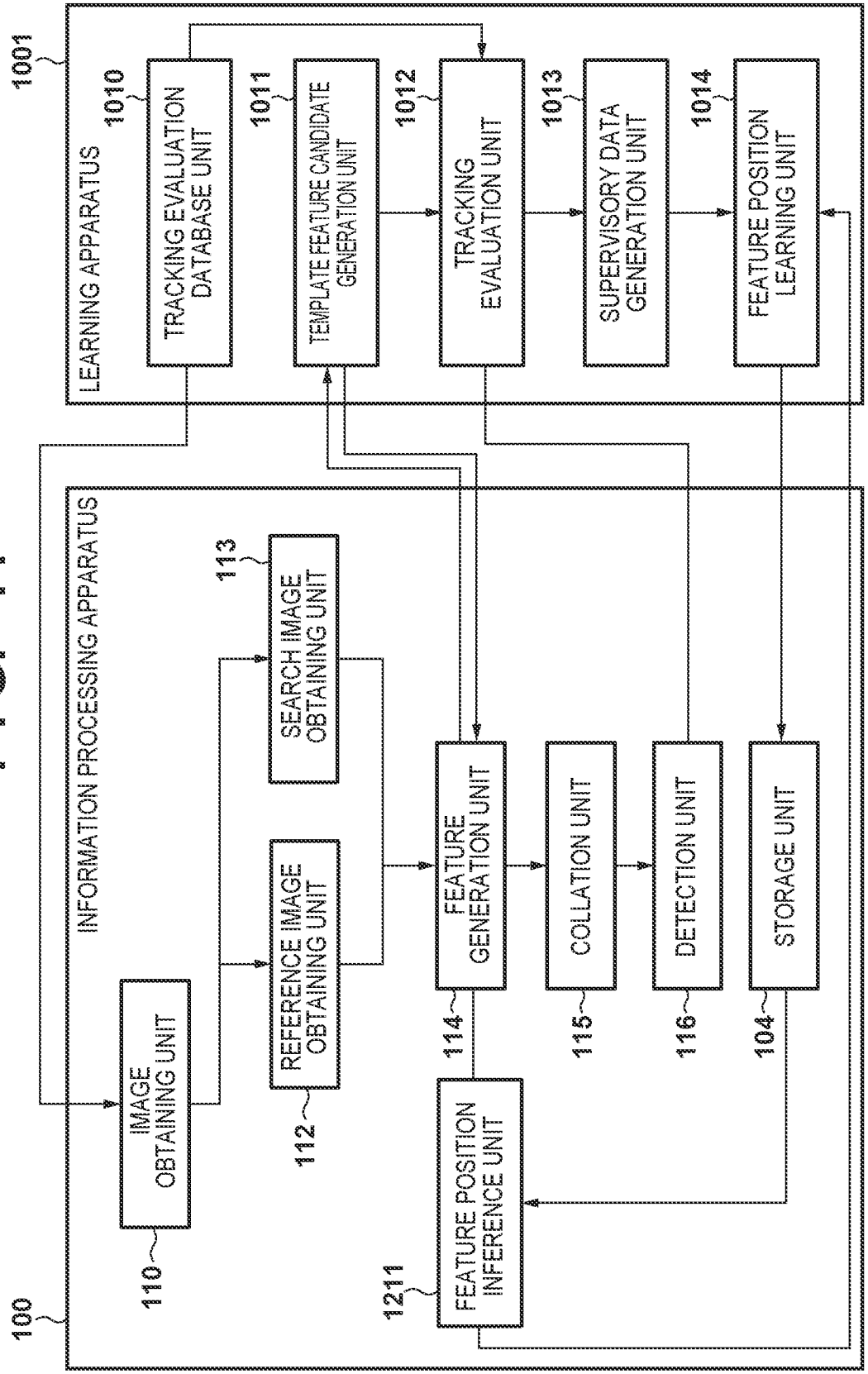
FIG. 14 is a view showing the functional configuration of a learning apparatus according to the second embodiment.

FIG. 14 is a view showing the functional configuration of a learning apparatus according to the second embodiment. The feature position inference unit 1211 that infers a feature position can be implemented by the same learning method as in the first embodiment using the learning apparatus 1001. However, unlike the first embodiment, an inference parameter is learned using a feature position map that is output when the intermediate feature obtained by inputting the reference image to the feature generation unit 114 is input to the feature position inference unit 1211.

As described above, according to the second embodiment, using, as an input, the intermediate feature generated by the feature generation unit, the feature position inference unit learns/infers a position to be easily tracked. Hence, as compared to the first embodiment in which an image is used as an input, the possibility that a feature to be easily tracked can be obtained becomes high.

Third Embodiment

In the third embodiment, a form in which a feature position inference unit infers the position of a part and the position of a characteristic color or pattern in a tracking target object will be described. More specifically, in the first embodiment, the feature position inference unit 111 obtains the position of a template feature based on the combination of an object center position and the periphery of the center position. In the third embodiment, template features of the center position, parts, colors, and patterns of a tracking target object are used.

<Operation of Information Processing Apparatus>

The configuration of an information processing apparatus according to the third embodiment is the same as in the first embodiment (FIG. 2), and a description thereof will be omitted. Also, the operation of the information processing apparatus according to the third embodiment is substantially the same as in the first embodiment (FIGS. 3A and 3B), but processing contents in some steps are different. The operations of steps whose processing contents are different from the first embodiment will be described below.

In step S303, a feature position inference unit 111 infers the position of a characteristic part, color, or pattern of an object in a reference image.

Figure 15:
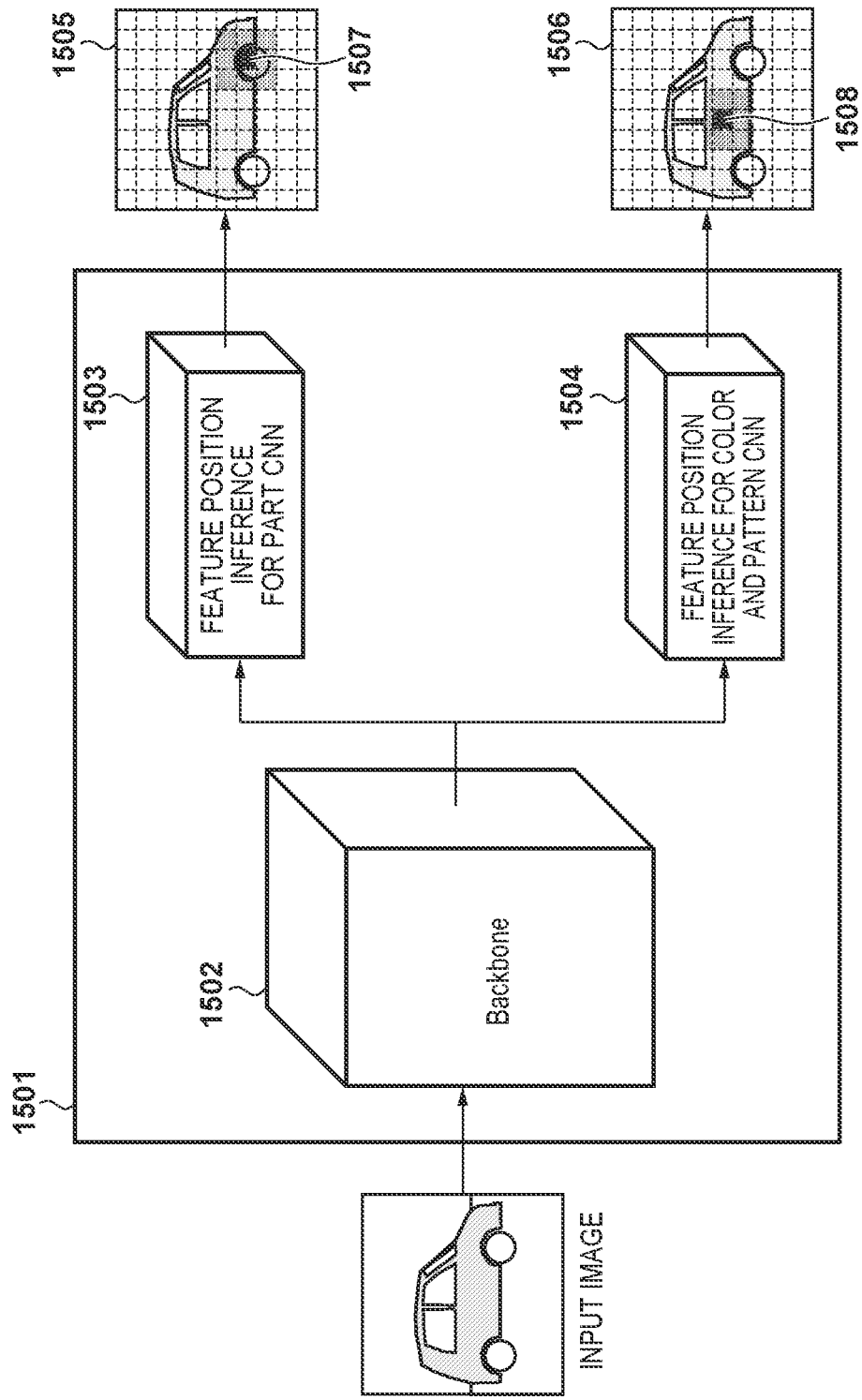
FIG. 15 is a view for explaining the configuration of a feature position inference unit according to the third embodiment.

FIG. 15 is a view for explaining the configuration of the feature position inference unit 111 according to the third embodiment. When an input image is input to a multilayer CNN 1501, the intermediate feature of the image is generated via a Backbone 1502. The generated intermediate feature is input to a feature position inference CNN 1503 for a part, which is configured to infer the position of a part of an object, and a feature position inference CNN 1504 for color/pattern (texture), which is configured to infer a characteristic color or the position of a pattern of an object. The feature position inference CNNs 1503 and 1504 output, as inference results, feature position maps 1505 and 1506 representing the positions of features, respectively.

In the example shown in FIG. 15, the feature position map 1505 shows that a peak value of likelihood exists at a position 1507 of a tire of an automobile, and the feature position map 1506 shows that a peak value exists on a pattern 1508 of the vehicle body of the automobile. A method of obtaining the inference parameter of a feature position inference CNN configured to infer such a position will be described later.

In step S304, a feature generation unit 114 cuts out, from the intermediate feature of the reference image obtained in step S303, a predetermined region concerning the center position of an object, a part position of the object, or the position of a characteristic color or pattern, thereby obtaining three template features. Note that as for the center position of the object, when a reference image that cuts out the center and the size of an object inferred by an object detector, as described concerning step S302 in the first embodiment, is used, the center of the reference image is the center position of the object. Hence, the template feature of the center position of the object is obtained from the position of the center on the feature map.

In step S309, a collation unit 115 collates the three template features and the feature of a search image and outputs a likelihood map representing the position of the tracking target object for each template feature by a likelihood and a size map representing the size of the object.

In step S310, a detection unit 116 judges, using the likelihood map obtained from each template feature, whether tracking succeeds or fails. The tracking target object is then detected using a size map paired with a likelihood map with which it is judged that tracking succeeds.

In this embodiment, a threshold for judging that the tracking target object is being tracked is set in advance for the likelihood representing the object position. If the likelihood of the peak point of the likelihood map obtained from the collation unit 115 is equal to or higher than the threshold, the detection unit 116 judges that tracking succeeds, and detects the peak point of the likelihood as the object position. After that, the detection unit 116 obtains the size of the tracking target object from the detected object position on the size map of the pair. On the other hand, if the likelihood is lower than the threshold, the above-described judgement of the success/failure of tracking and the detection processing are performed using a likelihood map and a size map obtained from another template feature.

At this time, when it is judged that tracking succeeds in a plurality of template features, the tracking target object is detected using a likelihood map in which the likelihood of the peak point is largest and a size map paired with the likelihood map. Alternatively, a priority order to be used may be provided for each template feature, and the tracking target object may be detected using the likelihood map of a template feature of a higher priority order in the template features with which tracking succeeds and a size map. The priority order can be set in the order of, for example, an object center, color/pattern, and parts. Hence, even if tracking fails using one template feature, tracking can be performed using another template feature.

<Learning Method>

A method of obtaining the inference parameters of the feature position inference CNNs 1503 and 1504 will be described next. The configuration of a learning apparatus according to the third embodiment is the same as in the first embodiment (FIG. 10), and a description thereof will be omitted. Also, the operation of the learning apparatus according to the third embodiment is substantially the same as in the first embodiment (FIG. 11), but processing contents in some function units are different. The operations of the function units whose processing contents are different from the first embodiment will be described below.

In this embodiment, candidates of the positions of features to be generated by a template feature candidate generation unit 1011 in step S1105 are set to "a part of an object" and "a characteristic color/pattern of an object".

To set a part of an object to a candidate of a feature position, the position of the part of the object is detected from the reference image. To detect the candidate of the part position of the object, a plurality of part positions of the object can be detected from the image using an object detector of non-patent literature 2. On the intermediate feature generated by the feature generation unit 114, the template feature candidate generation unit 1011 sets a position corresponding to each detected part position to a candidate of a feature position.

To set the color/pattern of an object to a candidate of a feature position, the following method can be considered. As for the color of the object, first, the brightness value of the representative color of the object is obtained based on the average value or mode of brightness values in the object of the image. Next, a plurality of values are sampled in ascending order of the difference between the brightness value at each position in the image and the brightness value of the representative color, and the positions are obtained as the positions of the characteristic color of the object. As for the pattern of the object, a texture region in the object is separated using texture segmentation as described in non-patent literature 3, and the center position of the region is obtained as the position of the characteristic pattern of the object. On the intermediate feature generated by the feature generation unit 114, the template feature candidate generation unit 1011 sets a position corresponding to each detected position of the characteristic color/pattern of the object to a candidate of a feature position (non-patent literature 3: Anil K., Jain et al., "Unsupervised Texture Segmentation Using Gabor Filters", 1991).

Using the candidates of feature positions obtained in the above-described way, the inference parameter of the feature position inference unit is learned. Note that in the third embodiment, cross entropy errors are calculated between the output results of the feature position inference CNNs 1503 and 1504 and corresponding feature position maps of supervisory data, and the sum is obtained as an error. Based on the calculated error value, the inference parameter (the weight of the CNN) of the feature position inference unit is updated using error backpropagation.

As described above, according to the third embodiment, template features of the center position, parts, colors, and patterns of the tracking target object are used. Hence, the probability that tracking succeeds can be increased as compared to the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-107358, filed Jul. 1, 2022 which is hereby incorporated by reference herein in its entirety.

What is claimed is:

1. An information processing apparatus comprising:
   at least one processor; and
   at least one memory storing instructions, which when executed by the processor, cause the information processing apparatus to:
   obtain a plurality of frame images in time-sequential order;
   generate a reference image that is a partial image including a target object image to be tracked from a first frame image included in the plurality of frame images;
   determine a plurality of positions in the reference image to be used for tracking processing of the target object image;
   generate a plurality of first features corresponding to the plurality of positions by inputting the reference image to a feature extraction neural network;
   generate a search image that is a target of the tracking processing of the target object image and is a partial image of a second frame image that is included in the plurality of frame images and follows the first frame image;
   generate a second feature by inputting the search image to the feature extraction neural network;
   identify a position of the target object image included in the search image based on a result of a correlation operation between each of the plurality of first features and the second feature;
   generate a plurality of likelihood maps each having a likelihood value representing a position likelihood of the target object image included in the search image based on the result of the correlation operation between each of the plurality of first features and the second feature;
   identify the position of the target object image included in the search image based on the plurality of likelihood maps; and
   generate a size map of the target object image included in the search image based on the result of the correlation operation between each of the plurality of first features and the second feature, and further identifies a size of the target object image based on the size map and the position of the target object image,
   wherein the search image is cut out from the second frame image based on the position and/or the size of the target object image in a frame image preceding the second frame image.

2. The information processing apparatus according to claim 1, wherein the instructions, when executed by the processor, further cause the information processing apparatus to:
   generate, as the plurality of first features, a plurality of small regions corresponding to the plurality of positions in a feature image obtained by inputting the reference image to the feature extraction neural network.

3. The information processing apparatus according to claim 1, wherein the instructions, when executed by the processor, further cause the information processing apparatus to:
   generate a position map having a likelihood value representing a position likelihood with a feature suitable for the tracking processing of the target object image by inputting the reference image to a second neural network and determines the plurality of positions based on a peak position in the position map.

4. The information processing apparatus according to claim 3, wherein the instructions, when executed by the processor, further cause the information processing apparatus to:
   generate a first position map having a likelihood value representing a position likelihood with a feature suitable for the tracking processing of a part of the target object image and a second position map having a likelihood value representing a position likelihood with a feature suitable for the tracking processing of one of a color and a pattern of the target object image, and the plurality of positions include at least one peak position in the first position map and at least one peak position in the second position map.

5. The information processing apparatus according to claim 3, wherein the second neural network includes a Backbone network, and a second CNN for feature position inference.

6. A learning apparatus configured to learn a second CNN of an information processing apparatus defined in claim 5, comprising:

a database configured to store time-series images and supplementary information concerning a position and a size of an object included in the time-series images;

at least one processor; and at least one memory storing instructions, which when executed by the processor, cause the learning apparatus to:

obtain a feature image generated by a feature extraction neural network for a frame image included in the time-series images and output a plurality of feature position candidates for the frame image to a first generation unit;

calculate an evaluation result for each of the plurality of feature position candidates based on an identification result by an identification unit for each of the plurality of feature position candidates and the supplementary information included in the database;

determine, based on the evaluation result, a feature position serving as a supervisor from the plurality of feature position candidates and generate supervisory data; and update a parameter of the second CNN of the second neural network based on the supervisory data.

7. The apparatus according to claim 6, wherein the plurality of feature position candidates for the frame image include a center position of a feature of the frame image and at least one position near the center position.

8. The information processing apparatus according to claim 1, wherein the instructions, when executed by the processor, further cause the information processing apparatus to:

identify the position of the target object included in the search image based on an average likelihood map obtained by averaging the plurality of likelihood maps, or identify the position of the target object included in the search image based on a likelihood map having a higher peak value in the plurality of likelihood maps.

9. The information processing apparatus according to claim 1, wherein the feature extraction neural network includes a first Convolutional Neural Network (CNN) for feature extraction.

10. The information processing apparatus according to claim 1, wherein the instructions, when executed by the processor, further cause the information processing apparatus to:

generate a feature image by inputting the reference image to the feature extraction neural network and determines the plurality of positions based on the feature image.

11. The information processing apparatus according to claim 1, wherein the instructions, when executed by the processor, further cause the information processing apparatus to:

generate a feature image by inputting the reference image to the feature extraction neural network, generate a position map having a likelihood value representing a position likelihood with a feature suitable for the tracking processing of the target object image by inputting the feature image to a second neural network, and determine the plurality of positions based on a peak position in the position map.

12. A tracking method in an information processing apparatus configured to track an object image included in a moving image, comprising:

obtaining a plurality of frame images in time-sequential order;

generating a reference image including a target object image to be tracked from a first frame image included in the plurality of frame images;

determining a plurality of positions in the reference image to be used for tracking processing of the target object image;

generating a plurality of first features corresponding to the plurality of positions by inputting the reference image to a feature extraction neural network;

generating a search image that is a target of the tracking processing of the target object image and is a partial image of a second frame image that is included in the plurality of frame images and follows the first frame image;

generating a second feature by inputting the search image to the feature extraction neural network;

identifying a position of the target object image included in the search image based on a result of a correlation operation between each of the plurality of first features and the second feature;

generating a plurality of likelihood maps each having a likelihood value representing a position likelihood of the target object image included in the search image based on the result of the correlation operation between each of the plurality of first features and the second feature;

identifying the position of the target object image included in the search image based on the plurality of likelihood maps;

generating a size map of the target object image included in the search image based on the result of the correlation operation between each of the plurality of first features and the second feature; and identifying a size of the target object image based on the size map and the position of the target object image, wherein the search image is cut out from the second frame image based on the position and/or the size of the target object image in a frame image preceding the second frame image.

13. A non-transitory computer-readable recording medium storing a program for causing a computer to execute as an information processing apparatus, the program, when executed causes the information processing apparatus to:

obtain a plurality of frame images in time-sequential order;

generate a reference image that is a partial image including a target object image to be tracked from a first frame image included in the plurality of frame images;

determine a plurality of positions in the reference image to be used for tracking processing of the target object image;

generate a plurality of first features corresponding to the plurality of positions by inputting the reference image to a feature extraction neural network;

generate a search image that is a target of the tracking processing of the target object image and is a partial image of a second frame image that is included in the plurality of frame images and follows the first frame image;

generate a second feature by inputting the search image to the feature extraction neural network;

identify a position of the target object image included in the search image based on a result of a correlation operation between each of the plurality of first features and the second feature;

generate a plurality of likelihood maps each having a likelihood value representing a position likelihood of the target object image included in the search image based on the result of the correlation operation between each of the plurality of first features and the second feature;

identify the position of the target object image included in the search image based on the plurality of likelihood maps; and generate a size map of the target object image included in the search image based on the result of the correlation operation between each of the plurality of first features and the second feature, and further identifies a size of the target object image based on the size map and the position of the target object image, wherein the search image is cut out from the second frame image based on the position and/or the size of the target object image in a frame image preceding the second frame image.

14. A learning apparatus configured to learn a second CNN of an information processing apparatus, wherein the information processing apparatus comprises:
at least one processor; and
at least one memory storing instructions, which when executed by the processor, cause the information processing apparatus to:

obtain a reference image including a target object image to be tracked;

determine a plurality of positions in the reference image to be used for tracking processing of the target object image;

generate a plurality of first features corresponding to the plurality of positions by inputting the reference image to a feature extraction neural network;

obtain a search image that is a target of the tracking processing of the target object image;

generate a second feature by inputting the search image to the feature extraction neural network;

identify a position of the target object image included in the search image based on a result of a correlation operation between each of the plurality of first features and the second feature; and generate a position map having a likelihood value representing a position likelihood with a feature suitable for the tracking processing of the target object image by inputting the reference image to a second neural network and determines the plurality of positions based on a peak position in the position map, wherein the second neural network includes a Backbone network, and a second CNN for feature position inference, and the learning apparatus comprising:
a database configured to store time-series images and supplementary information concerning a position and a size of an object included in the time-series images;
at least one processor; and
at least one memory storing instructions, which when executed by the processor, cause the information processing apparatus to:

obtain a feature image generated by a feature extraction neural network for a frame image included in the time-series images and output a plurality of feature position candidates for the frame image to a first generation unit;

calculate an evaluation result for each of the plurality of feature position candidates based on an identification result by an identification unit for each of the plurality of feature position candidates and the supplementary information included in the database;

determine, based on the evaluation result, a feature position serving as a supervisor from the plurality of feature position candidates and generate supervisory data; and update a parameter of the second CNN of the second neural network based on the supervisory data.

* * * * *